Dec. 20, 1938.    F. BISZANTZ    2,140,615
TIRE CARRIER AND BODY CONSTRUCTION
Filed Oct. 22, 1937    7 Sheets-Sheet 1
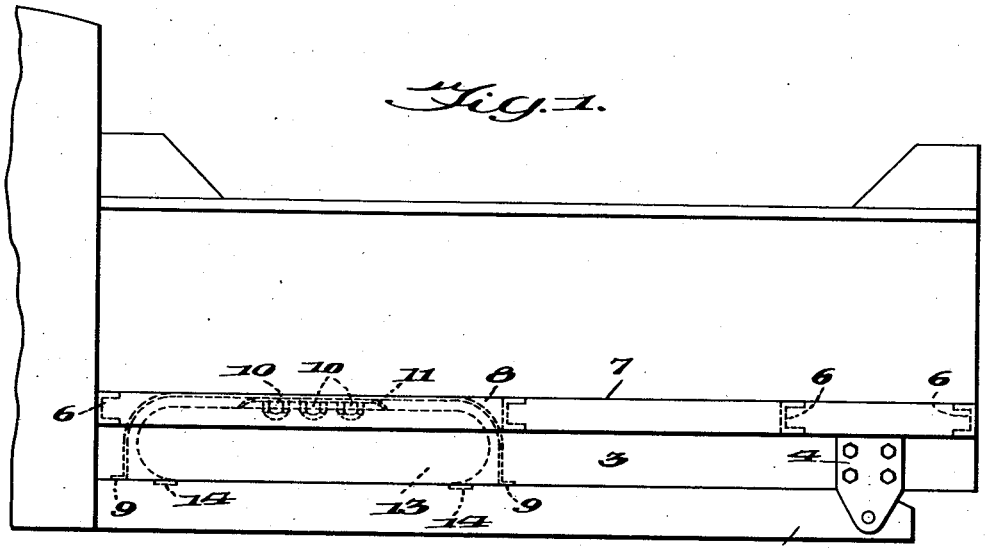
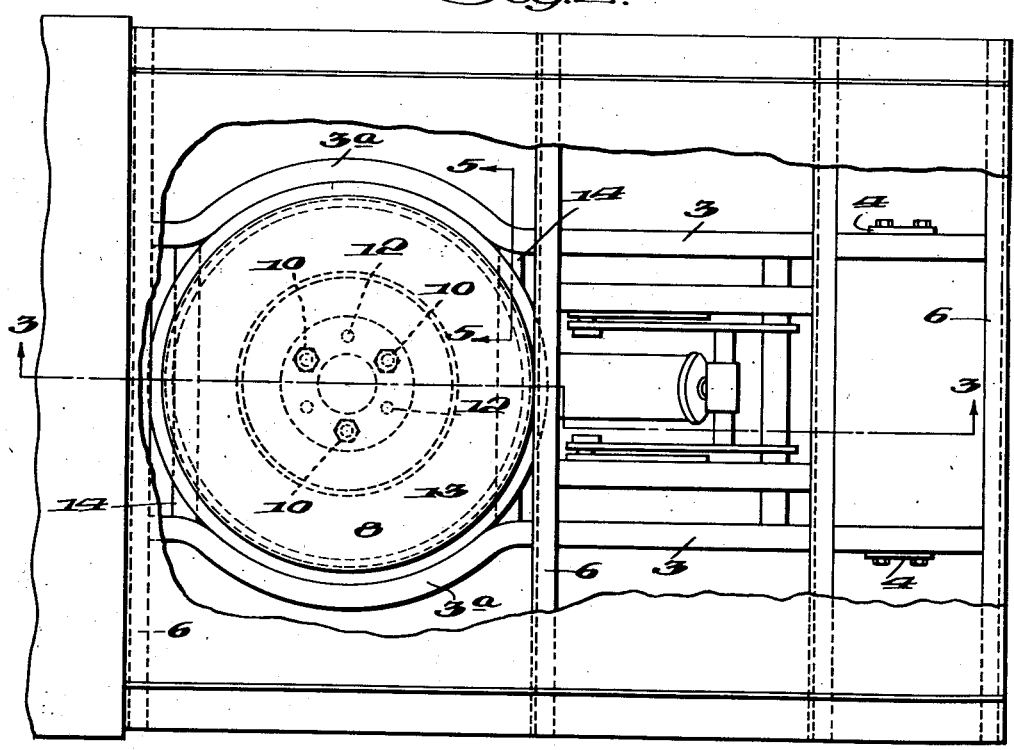
Inventor
Fred Biszantz,
By Tomlinson & Tomlinson, Attorneys Dec. 20, 1938.  F. BISZANTZ  2,140,615
TIRE CARRIER AND BODY CONSTRUCTION
Filed Oct. 22, 1937  7 Sheets-Sheet 2
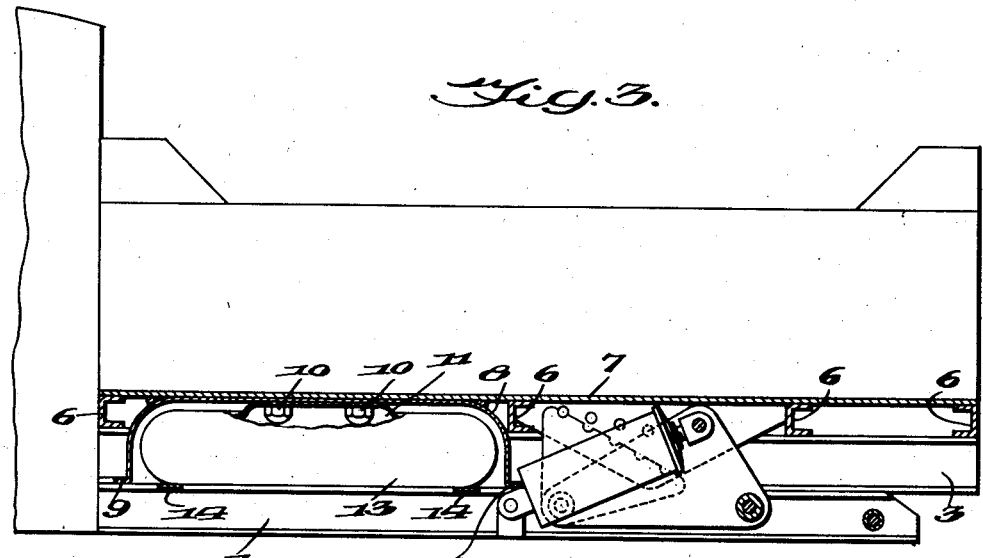
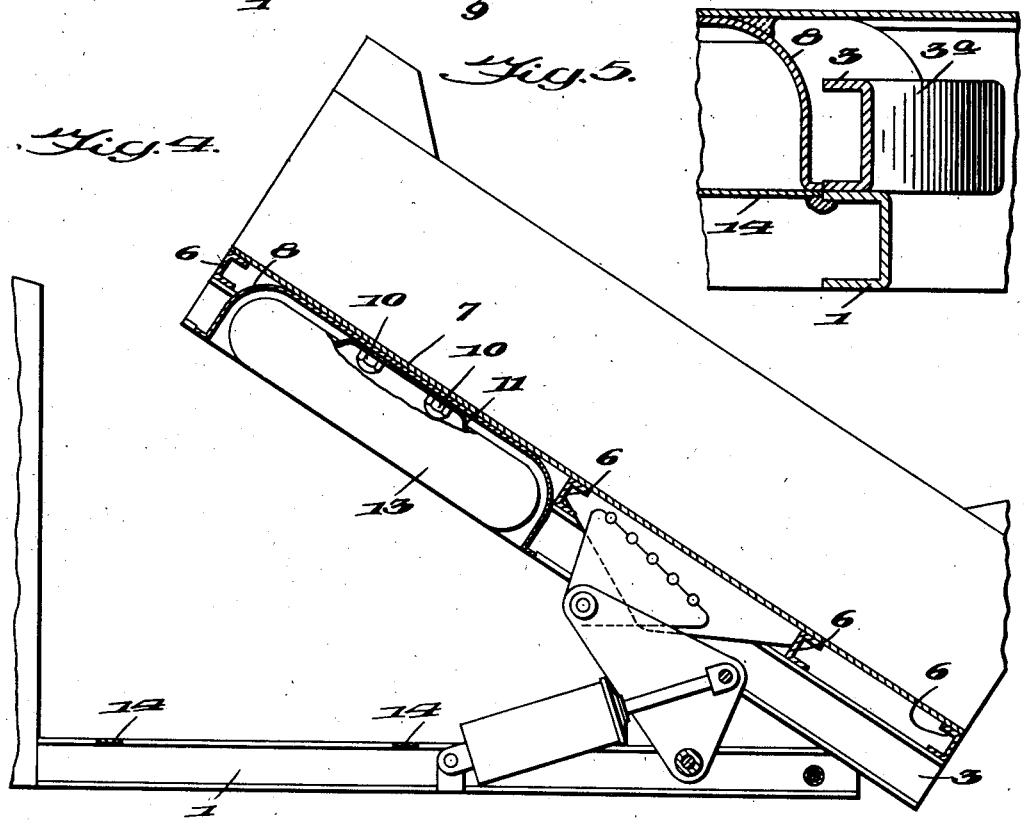
Inventor
Fred Biszantz,
By Toulmin & Toulmin, Attorneys Dec. 20, 1938.   F. BISZANTZ   2,140,615
TIRE CARRIER AND BODY CONSTRUCTION
Filed Oct. 22, 1937    7 Sheets-Sheet 3
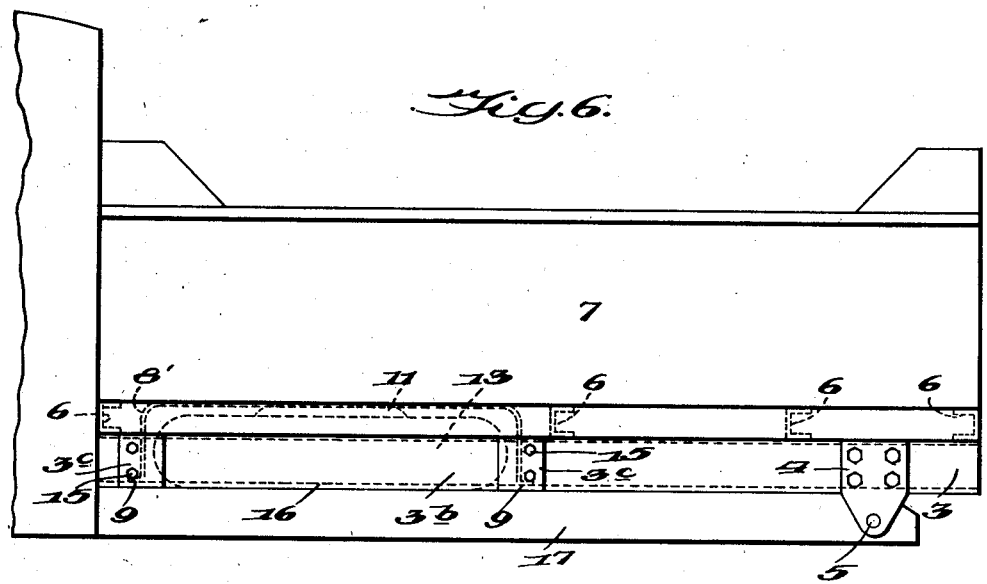
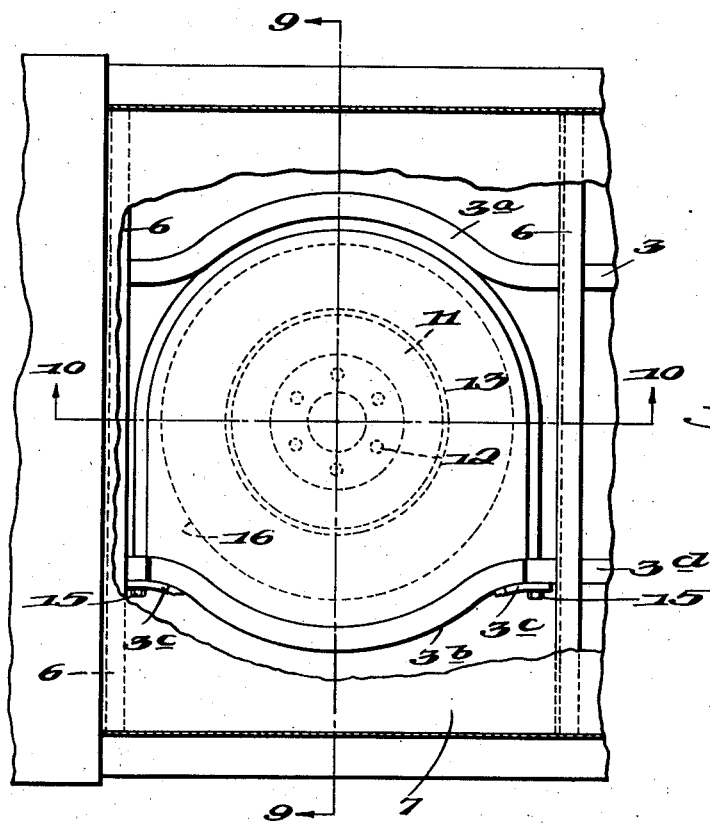
Inventor
Fred Biszantz,
By
Toulmin & Toulmin, Attorneys.

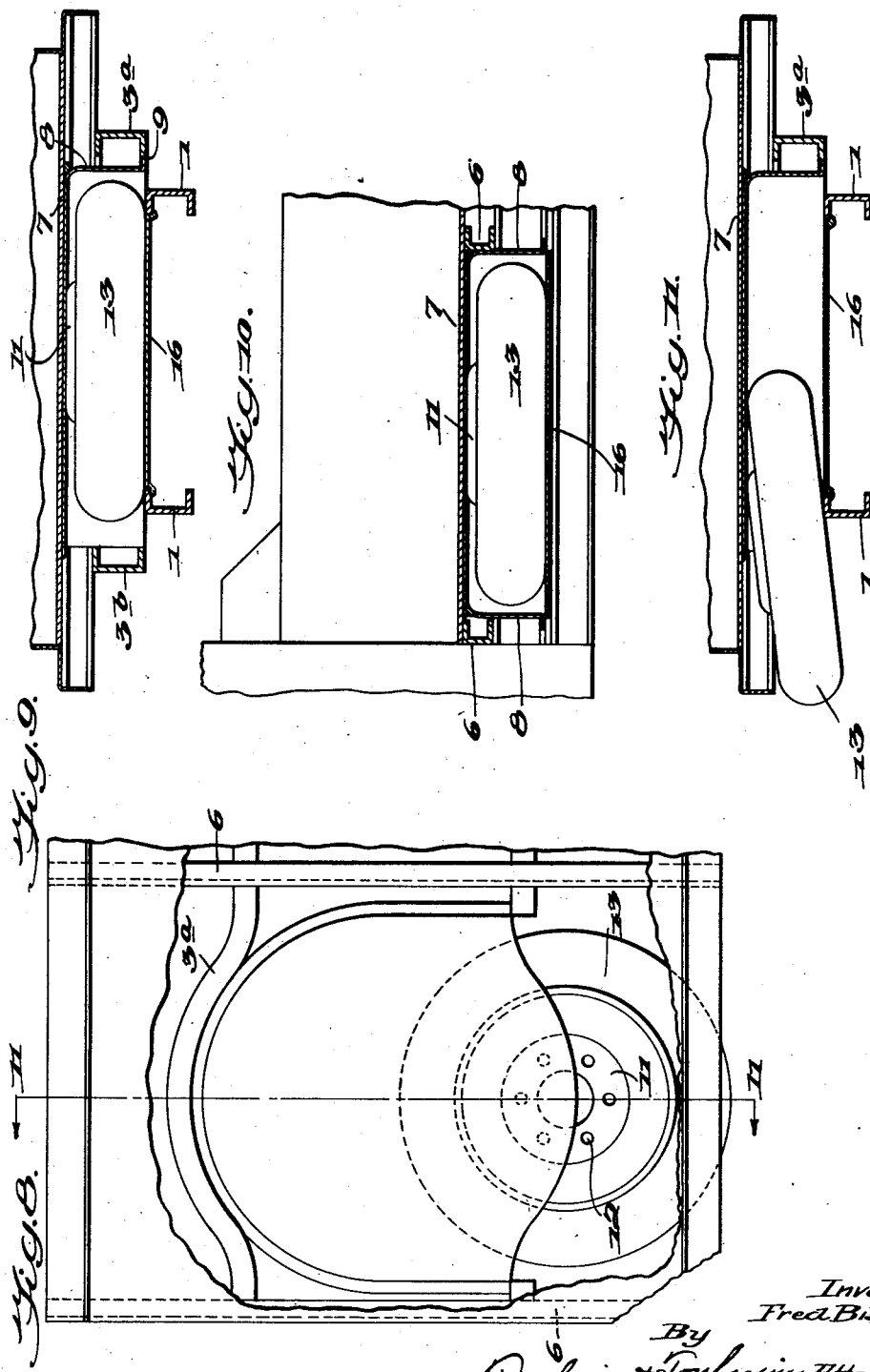

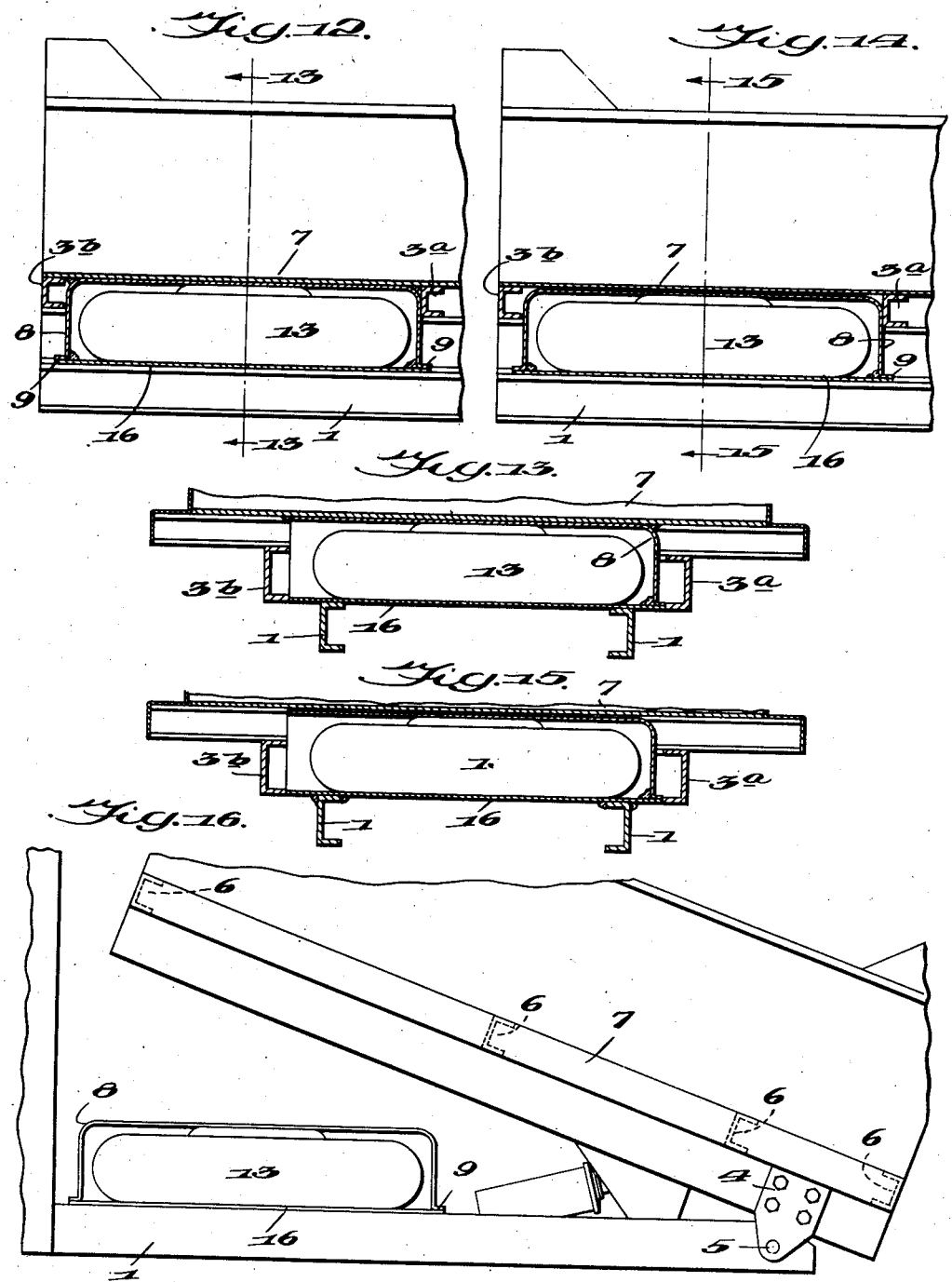

Dec. 20, 1938.    F. BISZANTZ    2,140,615
TIRE CARRIER AND BODY CONSTRUCTION
Filed Oct. 22, 1937    7 Sheets-Sheet 6
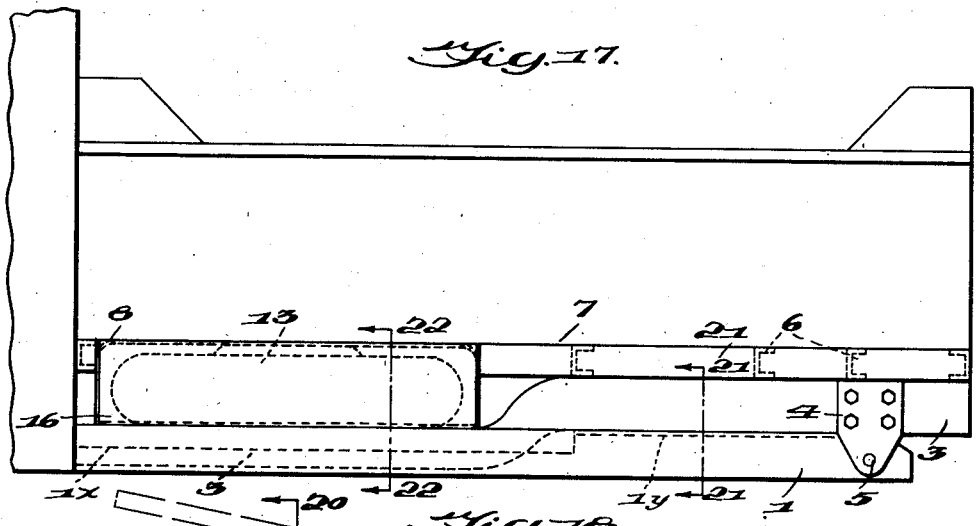
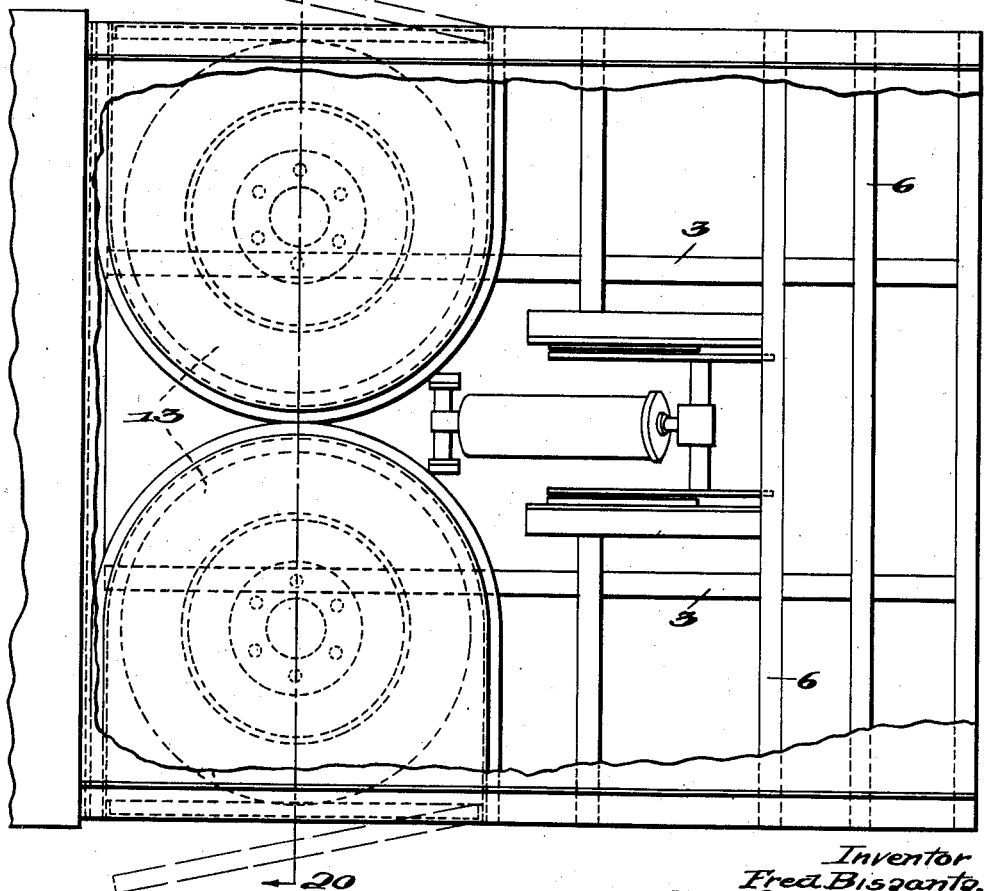
Inventor
Fred Biszantz,
By Topliur & Toplinn Attorneys Dec. 20, 1938.  F. BISZANTZ  2,140,615
TIRE CARRIER AND BODY CONSTRUCTION
Filed Oct. 22, 1937  7 Sheets-Sheet 7
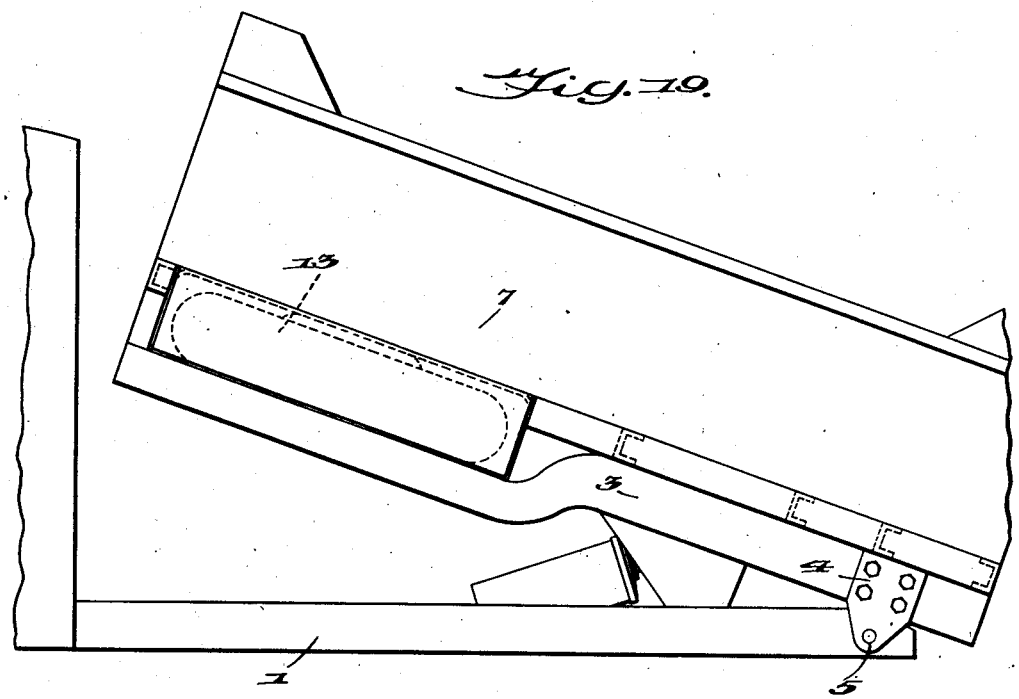
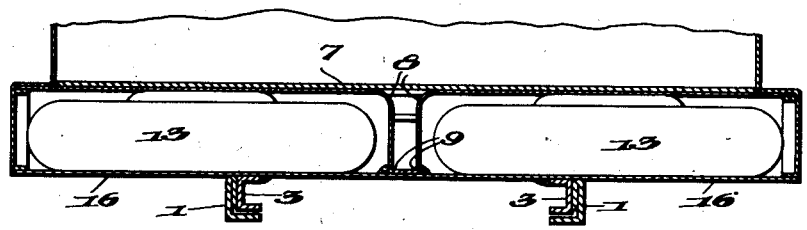
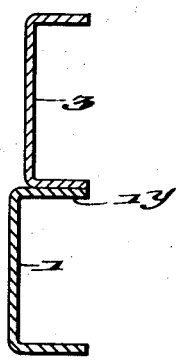
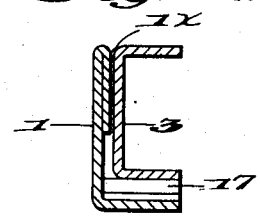
Inventor
Fred Biszantz,
By Tomlinson & Tomlinson, Attorneys Patented Dec. 20, 1938

2,140,615

UNITED STATES PATENT OFFICE 2,140,615

TIRE CARRIER AND BODY CONSTRUCTION

Fred Biszantz, Galion, Ohio, assignor to The Galion Metallic Vault Company, Galion, Ohio, a corporation of Ohio Application October 22, 1937, Serial No. 170,437

7 Claims. (Cl. 298—1)

This invention relates to body constructions and, in particular, to dump body constructions and the provision therein of tire and/or wheel carrying means.

It is an object of this invention to provide a dump body construction wherein means is provided for supporting and protectively enclosing one or more spare tires.

It is a further object of this invention to provide, in such a body, tire enclosing and carrying means providing for the support of a spare wheel and tire from a movable or tiltable dump body.

It is a further object of this invention to provide such means whereby a spare wheel and tire may be rigidly secured to the lower side of a movable dump truck body and enclosed by the tire mounting and enclosing means for movement upwardly with the dump body during tilting movement thereof.

It is a further object of this invention to provide, in such a construction, means on the subframe or supporting frame for the tilting dump body adapted to cooperate with the tire and wheel supporting and enclosing means on the dump body in such manner as to provide full enclosure thereof when the body is in its lowermost or substantially horizontal position.

It is a further object of this invention to provide, in such a construction, means providing for removal of the tire and/or wheel from the enclosure provided by the body construction.

It is a further object of this invention to provide, in such a construction, means providing for removal of the tire and wheel laterally from the enclosure provided in the body construction.

It is a further object of this invention to provide, in such a construction, means adapted, when the dump body is in its lowermost or substantially horizontal position, to provide full enclosure of the wheel and tire and to provide for ease of removal of the wheel and tire upon slight tilting of the dump body to provide access thereto.

It is a further object of this invention to provide such means which is particularly adapted to receive, house and support a plurality of wheels and tires.

It is a further object of this invention to provide such a construction wherein the wheel and tire supporting and enclosing means is so disposed as to occupy space which was, in prior constructions, merely waste space.

These and other objects and advantages will appear from the following description taken in connection with the drawings.

In the drawings:

Fig. 1 is a side elevation of a dump car truck body exhibiting one form of my invention;

Fig. 2 is a plan view of the same;

Fig. 3 is a longitudinal section on the line 3—3 of Fig. 2;

Fig. 4 is a longitudinal section similar to Fig. 3, but showing the dump truck body in hoisted position;

Fig. 5 is an enlarged sectional detail view on the line 5—5 of Fig. 2;

Fig. 6 shows in side elevation a dump truck body embodying a slightly different form of applicant's invention;

Fig. 7 is a partial plan view of a dump truck body constructed with the carrying compartment slightly modified to enable lateral access thereto, but otherwise similar to the construction shown in Figs. 1 and 2;

Fig. 8 is a plan view, similar to Fig. 7, with the member 3b thereof removed and the tire shown partway out of its compartment, to illustrate the manner of tire removal;

Fig. 9 is a transverse section on the line 9—9 of Fig. 7;

Fig. 10 is a longitudinal section on the line 10—10 of Fig. 7, the line of section being at right angles to that of Fig. 9;

Fig. 11 is a transverse section on the line 11—11 of Fig. 8, illustrating the manner of tire removal without hoisting of the body;

Fig. 12 is a longitudinal sectional view through the body, illustrating a further modification;

Fig. 13 is a transverse sectional view on the line 13—13 of Fig. 12 but showing the truck body slightly elevated above the subframe;

Fig. 14 is a longitudinal section through the body of a truck showing the tire compartment welded to plate 16 but free of the floor of the body;

Fig. 15 is a transverse section on the line 15—15 of Fig. 14, showing the compartment welded to the plate 16 and plate 16 welded to the subframe. In this construction the tire is free of the truck body, and may be removed either by taking member 3b away, or by hoisting the body, in which case side member 3b will be carried with the body, and the tire exposed;

Fig. 16 is a side elevation of a truck body, in hoisted position showing the tire compartment secured to the subframe, as in Figs. 14 and 15, with the member 3b omitted;

Fig. 17 is a view in side elevation illustrating a further modification;

Fig. 18 is a plan view of the construction shown in Fig. 17, with the truck body floor broken away to show the subframe structure below, doors being shown in broken lines controlling admission to the tire compartments;

Fig. 19 is a view in side elevation of the invention shown in Figs. 17 and 18, with the truck body in hoisted position;

Fig. 20 is a transverse sectional, detail view on the line 20—20 of Fig. 18;

Fig. 21 is a sectional detail view on the line 21—21 of Fig. 17, and

Fig. 22 is a sectional detail view on the line 22—22 of Fig. 17.

Referring to the drawings in detail and with reference to Figures 1 and 2, the body illustrated therein comprises a sub-frame formed of suitably braced side members 1 and front and rear members 2, which sub-frame is adapted to be rigidly secured to the truck vehicle chassis. The tiltable body frame comprises a pair of side members 3, each provided adjacent its rear with a downwardly depending bracket 4 rigidly secured thereto. Each bracket 4 is pivotally secured at 5 to the rear end of a side member 1 of the sub-frame.

Disposed transversely of the side members 3 and rigidly secured thereto by suitable means, such as welding, are the transverse channel members 6 having the floor of the body, generally designated 7, rigidly secured thereto, as by welding. The side members 3, transverse channel members 6 and body 7 are thus rigidly secured together for swinging movement upwardly in clockwise direction about the pivot 5 due to the provision of the brackets 4 on the side members 3. Any suitable means may be provided for causing upward tilting movement of the body frame and body with respect to the sub-frame 1, 2, and the particular means illustrated is most clearly described, illustrated and claimed in my copending application Serial No. 172,098, filed Nov. 1, 1937.

Referring to Figs. 1 to 5. Adjacent the front of the body, the side members 3 are bowed or bent outwardly to form arcuate portions 3a (Figure 1) adapted to accommodate the pan member 8 which is disposed therebetween and which has its upper or closed surface rigidly secured, as by welding, to the floor of the body 7. The lower side of the pan member 8 is open and provided with a marginal outwardly extending circumferential flange 9.

Centrally disposed in the pan member 8 and rigidly secured thereto, as by welding, are a plurality of suitable circumferentially spaced studs provided with suitable nuts 10. The studs are adapted to extend through apertures 12 in a spare wheel 11 having a tire 13 thereon, and by means of the nuts 10, the wheel 11 may be rigidly secured within the pan member 8 to the upper inner wall of the pan member 8 which is secured rigidly to the floor of the body 7.

In order to provide additional support for the tire and wheel in the lowermost or retracted position of the body, a plurality of transversely arranged strap members 14 are provided, which strap members extend transversely between the side members 1 and are rigidly secured at each end to one of the side members 1 in suitable manner, as by means of welding. When the body is in its lowered or retracted position, the strap members 14 engage the supported tire 13 to provide anti-rattle support for the wheel and tire. The spare wheel and tire are thus fully protected and are easily removable from the pan 8 by elevating the pivoted dump body 7 to a suitable degree. Due to the welding of the pan member 8 directly to the lower side of the dump body 7, substantial added rigidity is imparted thereto and it is, therefore, unnecessary to provide for complicated bracing of the body structure.

In Fig. 3 the cross members 14 are shown in section, the tire is shown in full lines with the pan 8 welded to the bottom of the truck body. This figure also shows the nuts 10 which are applied to the studs for holding the wheel to the pan 8. In Fig. 4 the same parts are shown as in Fig. 3, but the truck body is in hoisted position. This illustrates the separation of the tire from the cross-members 14, when the body is raised, and shows the position of the tire and wheel for removal, when the body is in said position.

The construction illustrated in Figures 6 to 11 is broadly similar to that illustrated in Figures 1 and 2, but the bowed or bent portion of one of the side members 3 is made separate from the member 7 and is designated 3b in Figure 7. This member has bracket members 3c rigidly secured at either end and adapted to be connected by means of bolts 15 to the side member 3d and to any suitable depending means provided on the body adjacent its opposite end.

Likewise, the strap members 14 are omitted and the plate member 16 substituted therefor and rigidly secured, as by welding, to the hoist sub-frame to provide a rest for the tire and wheel. The pan member 8 is secured to the lower side of the front portion of the body 7 in the same manner as in the construction illustrated in Figures 1 to 4, and the manner in which the wheel and tire are secured in the pan member 8 is also the same as that illustrated in Figures 1 to 4 and described above. The continuity of the plate member 16 provides for full enclosure of the lower side of the pan member 8 due to engagement of the flange 9 thereof with the plate member 16.

It is unnecessary, in the construction illustrated in Figures 6 to 11, to elevate the body 7 in order to remove the tire and wheel from the pan member 8 because, by removal of bolts 15 and subsequent removal of the member 3b, the pan member 8 is opened at one side in order to permit withdrawal of the wheel and tire from the enclosure. The plate member 16, pan member 8 and member 3b thus form, in effect, a pocket for enclosing the tire and wheel, which may be closed or opened for ease of access to the interior thereof by means of the removability of the member 3b.

If desired, in the construction illustrated in Figures 6 to 11, the supporting studs and nuts 10 may be omitted and the plate member 16, instead of being secured to the sub-frame, may be separate therefrom, although adapted to rest thereupon and welded directly to the flange 9 of the pan member 8, as shown in Figs. 12 and 13. This forms an enclosure which is rigidly attached to the body 7 and which moves therewith.

Likewise, the plate member 16 may be rigidly secured, as by welding, to the sub-frame, and the flange 9 of the pan member 8 rigidly secured thereto, as by welding as shown in Figs. 14 and 15, in which case, access to the enclosure formed by the plate member 16, pan member 8 and member 3b may be had, either by elevating the body or by removal of the member 3b, as above described.

In the case of this latter construction, the members 3 may be both made continuous with bent portions 3a because, upon elevation of the body 7 through suitable angle, access may be had to the open side of the enclosure formed by the pan member 8 and plate member 16. In Fig. 16 is shown a side elevation of the body of this construction, in hoisted position. The tire compartment is secured to the sub-frame as in Figs. 14 and 15, but the member 3b is omitted, the channel 3 being continuous. The tire is thus accessible only by hoisting of the body.

In Figures 17 to 22 inclusive, I have illustrated a second modified structure wherein a plurality of wheels and tires may be enclosed and supported for easy removal, irrespective of the angular position of the body 7.

In the construction illustrated in Figures 17 and 18, the longitudinal or side members 3 are straight in fore-and-aft direction, but the front ends thereof are bent downwardly, as shown in Figure 17. This provides space for accommodating the pan members 8 which are secured to the bottom of the body 7 in the same manner as in the constructions of Figures 1 to 4. The lower sides of these pan members are closed by the plates 16 rigidly secured to the flanges 9 in the above-described manner, and suitable door-means as shown in dotted lines in Fig. 18 and for the two tire compartments, is provided in the outer side of each pan member 8.

Each pan member 8, in the construction illustrated in Figures 17 and 18, is formed in the same manner and of substantially the same form as the corresponding members illustrated in Figures 3 and 4. The pockets formed by the pan members 8, plates 16 and doors for the pockets are rigidly secured to the body 7 to move therewith, and access to the pockets for removal of the tires and wheels therein may be had irrespective of the angular position of the body 7, with respect to the sub-frame 1, 2.

In order to provide stop means on the members 1 for supporting the members 3 in the retracted or substantially horizontal position of the body 7, I have provided a plurality of block members 17 suitably spaced and secured to a lower flange of each member 1 and adapted to be engaged by the lower flange of the longitudinal or side member 3, when the body 7 takes the retracted or substantially horizontal position as illustrated in Figures 17 and 18. These blocks 17 may be formed of any suitable material, and where it is desired to provide cushioning means between the members 1 and 3, they are formed of rubber or other suitable resilient material.

While suitable clamp means may be provided for securing the wheels and tires in position in the construction illustrated in Figures 17 and 18, such means are not necessary, as will be understood, because, when the door means of the pockets are closed, the resilient tire 13 will closely engage the same to prevent relative movement between the wheel, tire and supporting pocket.

It will be understood that the above-described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In a dump truck, a frame, a body swingable on said frame, separable complementary members carried by said frame and said body and engageable in the lowered position of said body to form an enclosure for a spare tire, and means associated with said enclosure for holding a spare tire therein.

2. In a dump truck, a frame, a body swingable on said frame, separable complementary members carried by said frame and said body and engageable in the lowered position of said body to form a support and an enclosure for a spare wheel and tire, and means connected to one of said members for attaching a spare tire and wheel thereto.

3. In a dump truck, a frame member, a body member swingable thereon, enclosing means on one of said members for enclosing a spare tire, means associated with said enclosing means and connected to one of said members for attaching a spare tire disposed therein, and means on the other member providing a rest for said tire and preventing its removal when the body is in lowered position on said frame.

4. In a dump truck, a frame, a dump body swingable thereon, spare tire supporting and enclosing means on said swingable dump body having an opening therein and swingable with said body, and means on said frame disposed over said opening in the lowered position of said body and removed from said opening in elevated positions of said body to provide free access to said opening.

5. In a dump truck, a chassis supported sub-frame, longitudinal side members on said sub-frame, longitudinal side members on said body supporting frame pivotally secured to the rear portion of said sub-frame, said last-named side members having downwardly bent forward portions, and means associated with said downwardly bent portions for providing a spare tire enclosure and adapted for telescopic engagement with the forward portions of the side members on said sub-frame.

6. In a dump truck, a chassis supported sub-frame, a dump body supporting frame including longitudinal frame members pivoted on said sub-frame, said longitudinal frame members having outwardly bent portions, and means between said outwardly bent portions for providing a spare tire enclosure.

7. In a dump truck, a chassis supported sub-frame, and a dump body supporting frame including longitudinal frame members pivoted on said sub-frame, said longitudinal frame members having outwardly bent portions for accommodating a spare tire enclosure and at least one of said longitudinal frame members having a removable portion providing access to said spare tire enclosure.

FRED BISZANTZ.